Jan. 16, 1934.  J. C. McCUNE  1,943,615
FLUID PRESSURE BRAKE
Filed Sept. 11, 1930
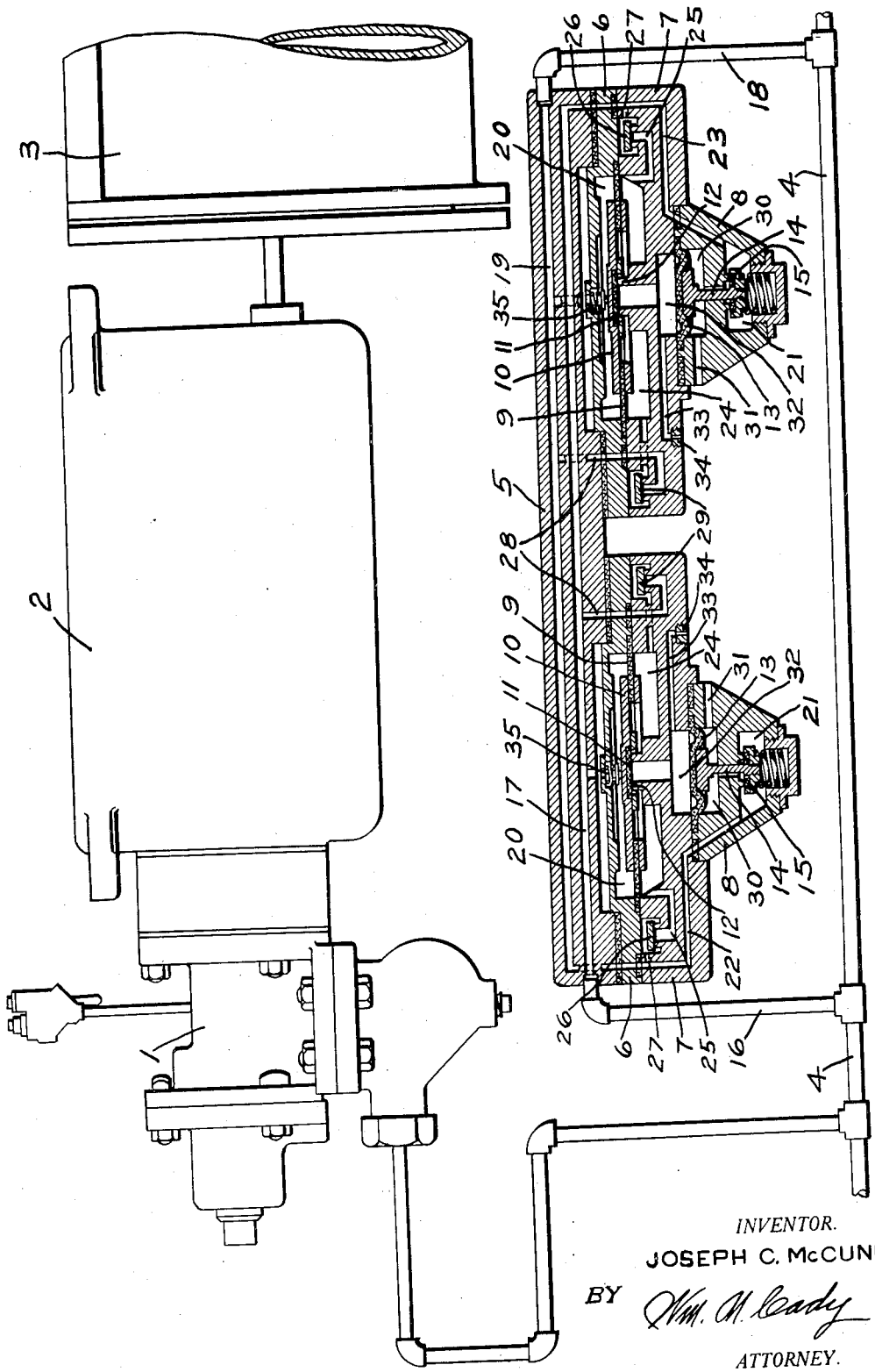
INVENTOR.
JOSEPH C. McCUNE
BY Wm. A. Cady
ATTORNEY.

Patented Jan. 16, 1934

1,943,615

UNITED STATES PATENT OFFICE 1,943,615

FLUID PRESSURE BRAKE

Joseph C. McCune, Edgewood, Pa., assignor to The Westinghouse Air Brake Company, Wilmerding, Pa., a corporation of Pennsylvania Application September 11, 1930
Serial No. 481,270

8 Claims. (Cl. 303—82)

This invention relates to fluid pressure brakes, and more particularly to means for effecting quick serial action through the brake pipe of an automatic fluid pressure brake system.

It has been found that the quick action means at present employed does not act with the desired rapidity on long trains, so that in effecting an emergency application of the brakes, the brakes are liable to be applied on cars at the head end of the train sufficiently in advance of the application of the brakes on cars at the rear end of the train, so that dangerous shocks are produced by the consequent running in of the slack.

The principal object of my invention is to provide an improved quick action means, by which the time of quick action transmission is reduced to a minimum.

In order to effect a quicker serial action, I propose to employ a very sensitive quick action means, which is quickly responsive to a light differential of pressures to effect a local reduction in brake pipe pressure, and in order to prevent this sensitive quick action device from operating when not intended, under gradual or service rates of reduction in brake pipe pressure and other fluctuations in brake pipe pressure not at an emergency rate of reduction, I employ a new principle of operation, in which I utilize the gradient in pressure set up between two points in the brake pipe such as at points at opposite ends of the car, to produce a differential of pressures on a diaphragm or movable abutment.

It is necessary that there be a heavy volume flow of fluid at a high velocity in the brake pipe, which is only produced when the brake pipe is reduced at an emergency rate, in order that a sufficient gradient will be set up between two points in the brake pipe, so that even the slight differential of pressures necessary to operate the quick action diaphragm will be produced.

Thus my improved quick action device, being very sensitive and quickly responsive to light differential pressures, will produce a transmission of quick action in less time than heretofore, while at the same time the device will only operate when an emergency rate of reduction in brake pipe pressure is initiated.

In the accompanying drawing, the single figure is a diagrammatic view, partly in section, of a car fluid pressure brake equipment, showing my improved quick action valve device associated therewith.

The brake equipment may comprise the usual triple valve device 1, auxiliary reservoir 2, brake cylinder 3, and brake pipe 4, and according to my invention, a quick action valve device is provided comprising a pipe bracket 5 having secured thereto a pair of quick action valve mechanisms, each comprising casing sections 6, 7 and 8.

Clamped between the casing sections 6 and 7 is a flexible diaphragm 9 which carries a centrally disposed disc 10. Said disc is provided with a valve seat 11 adapted to engage at seat rib 12 carried by the casing section 7. Clamped between the casing sections 7 and 8 is a flexible diaphragm 13, which is adapted to operate a valve stem 14, carrying a valve 15.

A pipe 16, connected to the brake pipe at one point, leads to a passage 17 in the pipe bracket 5, and a pipe 18, connected to the brake pipe at another point, leads to a passage 19 in the pipe bracket 5. Passage 17 is connected to chamber 20 of the left hand quick action valve mechanism, through openings in the pipe bracket 5 and in the casing section 6, and passage 19 is similarly connected to chamber 20 of the right hand valve mechanism.

Valve chamber 21 of the left hand valve mechanism is connected, through passage 22 with passage 19, and valve chamber 21 of the right hand valve mechanism is connected, through passage 23 with passage 17.

Diaphragm chamber 24 of the left hand valve mechanism is connected, through a passage 25, and past a check valve 26, and through a choked passage 27 with passage 22, and diaphragm chamber 24 of the right hand valve mechanism is similarly connected to passage 23. The check valves 26 permit flow of fluid from the chamber 24 to the brake pipe.

Passage 17 is connected through passage 28 and past a check valve 29, to chamber 24 of the left hand valve mechanism, and chamber 24 of the right hand valve mechanism is similarly connected to passage 19, the check valves 29 permitting flow from the brake pipe to said chamber.

Valve chamber 21 communicates, through the space around stem 14 with diaphragm chamber 30, which chamber is open to the atmosphere, through passage 31, and diaphragm chamber 32 is connected to a passage 33 which opens to the atmosphere through a restricted passage in a choke plug 34.

In operation, when the brake pipe 4 is charged with fluid under pressure, fluid flows from the brake pipe through pipe 16 and passage 17 to the diaphragm chamber 20 of the left hand valve mechanism and also through passage 28, past check valve 29 to diaphragm chamber 24, As the fluid pressure in the opposing chambers 20 and 24 build up simultaneously, the valve seat 11 is held in engagement with the seat rib 12 by the tendency of the diaphragm 9 to remain in normal position, as assisted by a light spring 35. In a similar manner, the diaphragm chambers 20 and 24 of the right hand valve mechanism are charged with fluid under pressure from the brake pipe.

The diaphragm chambers 30 and 32 being normally at atmospheric pressure, the valve 15 of each valve mechanism is held seated by spring 36, assisted by the brake pipe pressure in valve chamber 21, acting on the valve 15.

Assuming that a reduction in brake pipe pressure at an emergency rate has been initiated in the brake pipe at a point to the left of the pipe 16, the rate of reduction is such that a gradient or difference of pressure is set up in the brake pipe between the points where the pipes 16 and 18 connect with the brake pipe. The pipe 16 being connected to the diaphragm chamber 20 of the left hand valve mechanism, and the pipe 18 being connected to the diaphragm chamber 24 of the left valve mechanism by way of check valve 26, passage 22 and passage 19, a differential of fluid pressures will be set up in the chambers 20 and 24, corresponding with the gradient established in the brake pipe between the two points where the pipes 16 and 18 are connected to the brake pipe.

While this differential pressure may be light, it is sufficient to operate the diaphragm 9, which is very sensitive to movement, and the lower pressure being developed in chamber 20, the diaphragm will be deflected upwardly, so that the valve seat 11 is moved away from the seat rib 12.

Fluid under pressure is then supplied at a rapid rate from chamber 24 to chamber 32, and since fluid under pressure is thus supplied to chamber 32, faster than it can escape through the restricted port in choke plug 34, the pressure in chamber 32 is built up so as to deflect the flexible diaphragm 13 downwardly. The valve 15 is thereby unseated, permitting fluid under pressure to be vented from the brake pipe by way of pipe 18, passage 19, passage 22, and past the valve 15 to chamber 30, which is open to the atmosphere, through passage 31.

A local reduction in brake pipe pressure is thus produced, which causes similar action of the next quick action valve mechanism on the succeeding car and so on throughout the train, so that quick action is serially propagated throughout the train.

While the flexible diaphragm 9 is designed to respond to a slight differential in pressures between the chambers 20 and 24, this slight differential in pressures can only be created when the brake pipe pressure is reduced at an emergency rate, where the fluid in the brake pipe is moving at a high velocity and in great volume, and consequently the diaphragm 9 will not be operated when the brake pipe pressure is reduced at a service rate, or by fluctuations in brake pipe pressure due to other causes.

If an emergency rate of reduction in brake pipe pressure be initiated at a point in the brake pipe at the right of the point where the pipe 18 connects with the brake pipe, then the right valve mechanism will be operated to cause quick action in a manner similar to that just described in connection with the left hand quick action valve mechanism.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of two quick action valve mechanisms, each valve mechanism having one side communicating with the brake pipe at one point in the brake pipe through a communication which permits the substantially free flow of fluid from said valve mechanism to the brake pipe, and having the opposite side communicating with the brake pipe at another point in the brake pipe, through a communication which permits the substantially free flow of fluid from the valve mechanism to the brake pipe, each valve mechanism being therefore subject to opposing fluid pressures continually varying according to variations in fluid pressure at different points in the brake pipe and operated upon creation of a differential between said opposing pressures for venting fluid from the brake pipe, one valve mechanism being operative upon an emergency rate of reduction in brake pipe pressure initiated at one point in the brake pipe and the other valve mechanism being operative upon an emergency rate of reduction in brake pipe pressure initiated at another point in the brake pipe.

2. In a fluid pressure brake, the combination with a brake pipe, of two quick action valve mechanisms, each valve mechanism having one side communicating with the brake pipe at one point in the brake pipe through a communication which permits the substantially free flow of fluid from said valve mechanism to the brake pipe, and having the opposite side communicating with the brake pipe at another point in the brake pipe, through a communication which permits the substantially free flow of fluid from the valve mechanism to the brake pipe, each valve mechanism being therefore subject to opposing fluid pressures continually varying according to variations in fluid pressure at different points in the brake pipe and operated upon creation of a differential between said opposing pressures for venting fluid from the brake pipe, the operation of one or the other of said valve mechanisms being dependent upon the direction from which an emergency rate of reduction in brake pipe pressure approaches said valve mechanisms.

3. In a fluid pressure brake, the combination with a brake pipe, of two quick action valve mechanisms, each valve mechanism having one side communicating with the brake pipe at one point in the brake pipe through a communication which permits the substantially free flow of fluid from said valve mechanism to the brake pipe, and having the opposite side communicating with the brake pipe at another point in the brake pipe, through a communication which permits the substantially free flow of fluid from the valve mechanism to the brake pipe, each valve mechanism being therefore subject to opposing fluid pressures varying at all times according to variations in fluid pressure at different points in the brake pipe and operated upon creation of a differential between said opposing pressures for venting fluid from the brake pipe, the operation of one valve mechanism being effected upon an emergency rate of reduction in brake pipe pressure approaching said valve mechanisms from one direction, and the operation of the other valve mechanism being effected upon an emergency rate of reduction in brake pipe pressure approaching said valve mechanisms from the opposite direction.

4. In a fluid pressure brake, the combination with a brake pipe, of a quick action valve mechanism comprising a valve for venting fluid from the brake pipe, a flexible diaphragm operated by a variation in fluid pressure for operating said valve, and a flexible diaphragm subject to the opposing pressures in chambers at opposite sides of said diaphragm for varying the pressure on the first mentioned diaphragm, the pressures in said chambers varying with the pressures in the brake pipe at two different points.

5. In a fluid pressure brake, the combination with a brake pipe, of a quick action valve mechanism comprising a valve for venting fluid from the brake pipe, a flexible diaphragm operated by a variation in fluid pressure for operating said valve, a flexible diaphragm subject to the opposing pressures in chambers at opposite sides of the diaphragm, and a valve seat carried by and operated by said diaphragm for varying the pressure on the first mentioned diaphragm.

6. In a fluid pressure brake, the combination with a brake pipe, of a quick action valve mechanism comprising a valve for venting fluid from the brake pipe, a flexible diaphragm for operating said valve having a chamber at one side open to the atmosphere through a restricted port, valve means for supplying fluid under pressure to said diaphragm, and a flexible diaphragm operated upon a sudden reduction in brake pipe pressure for operating said valve means.

7. In a fluid pressure brake, the combination with a brake pipe, of two quick action valve mechanisms, each operative upon the creation of a predetermined differential pressure on its opposite sides for venting fluid from the brake pipe and each valve mechanism having one side in free communication with the brake pipe at one point in the brake pipe, and having the opposite side in free communication with the brake pipe at another point in the brake pipe, and each operative to vent fluid from the brake pipe, by the differential pressure which is created on opposite sides upon an emergency reduction in brake pipe pressure, and means whereby one valve mechanism is operable to vent fluid from the brake pipe, only when the flow of fluid in the brake pipe is in one direction, and the other valve mechanism is operable to vent fluid from the brake pipe, when the flow of fluid in the brake pipe is in the opposite direction.

8. In a fluid pressure brake, the combination with a brake pipe, of two quick action vent valve mechanisms, each comprising a valve means operative to vent fluid from the brake pipe, and a movable abutment for effecting the operation of said valve means and having a chamber at one side communicating with the brake pipe at one point in the brake pipe through a communication which permits substantially free flow of fluid from said chamber to the brake pipe, and having a chamber at the opposite side communicating with the brake pipe at another point in the brake pipe through a communication which permits substantially free flow of fluid from said last mentioned chamber to the brake pipe, and means whereby the movable abutment of one valve mechanism is operable to effect the operation of its associated valve means only upon flow of fluid in the brake pipe in one direction and the movable abutment of the other valve mechanism is operable to effect the operation of its associated valve means only upon flow of fluid in the brake pipe in the opposite direction.

JOSEPH C. McCUNE.